United States Patent
Ellion et al.

[11] 3,871,828
[45] Mar. 18, 1975

[54] HYDRAZINE GAS GENERATOR

[75] Inventors: M. Edmund Ellion, Arcadia; Dwight A. Mahaffy, Englewood, both of Calif.

[73] Assignee: Hughes Aircraft Company, Culver City, Calif.

[22] Filed: Oct. 10, 1972

[21] Appl. No.: 296,392

[52] U.S. Cl................. 23/281, 23/288 R, 60/203, 60/203, 60/260, 60/39.71, 60/39.46, 60/39.74 A, 239/552
[51] Int. Cl............................. B01j 0/04, F02k 9/02
[58] Field of Search....... 60/39.46, 200 R, 203, 218, 60/39.71, 39.74 A, 258, , 227; 23/281, 288 R, 289; 239/568, 590.3, 590.5, 553.3, 553.5, 552

[56] References Cited
UNITED STATES PATENTS

| | | | |
|---|---|---|---|
| 2,438,170 | 3/1948 | Hughey | 239/552 |
| 2,823,075 | 2/1958 | Shirley | 239/553.3 X |
| 2,832,643 | 4/1958 | Bletcher et al. | 239/552 |
| 3,135,089 | 6/1964 | Dryden | 60/227 |
| 3,135,703 | 6/1964 | Sill | 60/227 |
| 3,266,241 | 8/1966 | Jennings | 60/258 |
| 3,377,140 | 4/1968 | Hall | 60/258 X |
| 3,447,316 | 6/1969 | White | 23/288 R X |
| 3,695,041 | 10/1972 | Eggers et al. | 60/258 X |
| 3,719,046 | 3/1973 | Sutherland et al. | 60/39.46 X |

*Primary Examiner*—Carlton R. Croyle
*Assistant Examiner*—Robert E. Garrett
*Attorney, Agent, or Firm*—Allen A. Dicker, Jr.; W. H. MacAllister, Jr.

[57] ABSTRACT

Hydrazine is delivered through a single orifice, followed by distribution channels, to a catalyst containing decomposition chamber. The distribution channels are cut in the end and along the length of the cylinder, and hydrazine flows to spaced locations around an annular distribution screen. From the annular screen, the hydrazine is directly delivered into the chamber containing the decomposition catalyst. Part of the heat of decomposition is delivered to the distribution cylinder to to preheat the incoming hydrazine. The hot gas thus generated is delivered to a divergent thrust nozzle.

10 Claims, 4 Drawing Figures

PATENTED MAR 18 1975 3,871,828

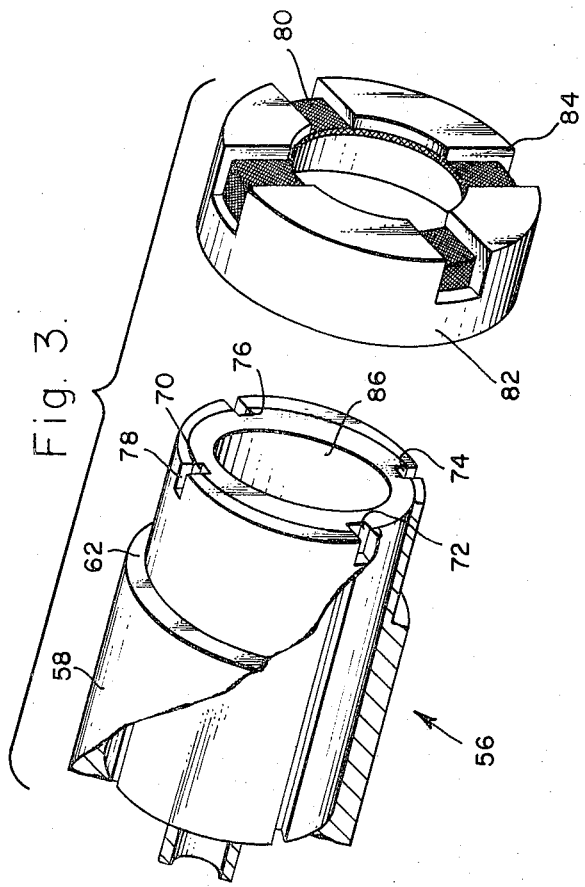
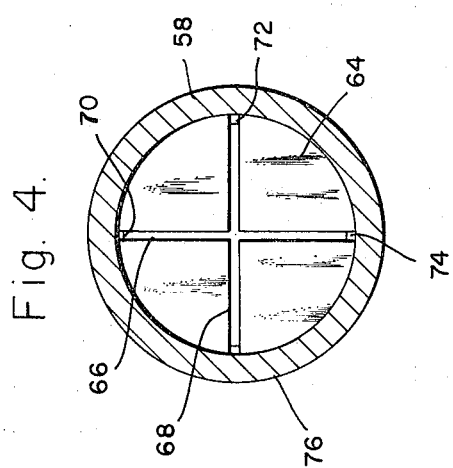

3,871,828

HYDRAZINE GAS GENERATOR

BACKGROUND

This invention is directed to a hydrazine gas generator, and particularly to the structure for distributing hydrazine into the decomposition chamber therein.

Distribution of liquid hydrazine into a decomposition catalyst bed and the subsequent exothermic conversion of the hydrazine into gaseous products and heat, together with the discharge thereof through a nozzle to produce thrust, has previously been accomplished in several ways. One method of liquid distribution involves submerging liquid distribution nozzle outlets deep inside the bed of catalyst material. Another method consists of using small diameter capillary tubes as liquid flow control paths to deliver the liquid hydrazine to selected locations within the bed of catalyst material. Another method utilizes recirculation of a portion of the heated product gases from the decomposed liquid hydrazine as an aid in the distribution of the as yet undecomposed liquid hydrazine. Still another method involves separation of the entering liquid into several paths by passage of the liquid through a metal distribution screen.

Decomposition of liquid hydrazine into high temperature ammonia, hydrogen, and nitrogen gases has previously been accomplished by causing the hydrazine to flow in contact with a catalyst material which initiates and sustains the decomposition process. The preferred catalyst material is manufactured by the Shell Oil Company under the name "Shell 405 Catalyst". This catalyst is in pellet form and is packed and restrained in an enclosing decomposition chamber. When used as a thruster, the decomposition chamber is preferably integral with a convergent-divergent nozzle through which the hot gaseous products of decomposition are exhausted to produce thrust.

SUMMARY

In order to aid in the understanding of this invention, it can be stated in essentially summary form that it is directed to a hydrazine gas generator which encloses a liquid hydrazine distributor for distributing the hydrazine into a catalyst bed for decomposition, the distributor being designed and positioned for efficient liquid hydrazine distribution, and for distributing heat from the exothermic catalytic disassociation of the liquid hydrazine to the incoming liquid hydrazine to enhance disassociation efficiency.

It is an object of this invention to provide a hydrazine gas generator having an efficient liquid hydrazine distribution system into the disassociation catalyst. It is a further object to provide an injector which efficiently distributes the liquid hydrazine to the bed of catalyst material. It is a further object to provide a system for the efficient delivery and distribution of hydrazine liquid to the hydrazine disassociation catalyst to convert the hydrazine into hot gaseous products which, in turn, are exhausted through a convergent-divergent nozzle to produce thrust. It is another object to provide a hydrazine distribution system which maximizes the efficiency by proper hydrazine distribution. It is a further object to provide screens which prevent catalyst particles from entering the hydrazine injector flow passages to maintain flow in all passages. It is another object to provide a hydrazine thrust chamber of simplified design to ease the manufacture and, by the combination and integration of functions of particular parts of structure, to provide an economic and trouble-free device for manufacturing use. It is another object to provide a thrust chamber which utilizes the minimum number of small tubes and mechanical joints which are exposed to handling and vibration environment, to result in a higher reliability for the structure.

Other objects and advantages of this invention will become apparent from a study of the following portion of this specification, the claims, and the attached drawings.

FIG. 3 is an exploded perspective, with parts broken away, showing details of the distributor assembly.

FIG. 4 is an enlarged section taken generally along the line 4—4 of FIG. 2, showing details of a portion of the liquid hydrazine channels in the distributor assembly.

DESCRIPTION OF THE PREFERRED EMBODIMENT

Figure 1:
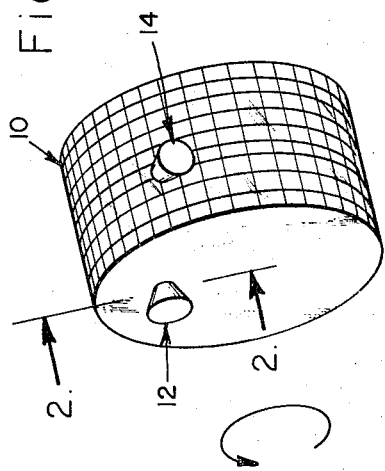
FIG. 1 is a perspective view of a device in which the hydrazine gas generator of this invention is incorporated.

FIG. 1 illustrates a device 10 to which thruster 12 is applied. The device 10 may be any kind of device to which a thrust force resulting from the reaction by discharge of hot gas would be useful. For example, it may be a pinwheel type device. It may be a vehicle, either supported on the land, water, or in the air. Furthermore, for convenience in illustration, the device 10 can be a space vehicle, either in orbit or in transit. The device 10 is illustrated as having thrusters 12 and 14 oriented in different directions to apply forces in different directions to the device 10. An appropriate number of thrusters can be employed to apply the desired forces in the appropriate directions. The hydrazine thruster of this invention is the thruster 12, which is illustrated in more detail in FIG. 2, and parts thereof are illustrated in FIGS. 3 and 4.

Device 10 has a frame 16 by which structural parts are mounted thereon. Thruster 12 has a base plate 18 which is mounted on frame 16 by a plurality of bolts, preferably three in number, of which bolts 20 and 22 are illustrative. The heads of these bolts engage under frame 16 and the nuts over baseplate 18. Spacing is provided by spacer tubes 24 and 26. This mounting of baseplate 18 is provided so that the direction of orientation of the thrust 12 can be carefully controlled. Furthermore, it is arranged so that heat transfer from the baseplate to the frame 16 of device 10 can be controlled. The attachment equipment can be made to be of low thermal conductivity, if such is desired.

Decomposition chamber 28 is located within the tubular housing 30. The tubular housing 30 is closed on its front end by welding to baseplate 18, conveniently located in collar 32 integrally formed with the baseplate. The decomposition catalyst, which for hydrazine is preferably Shell Oil Company "Shell 405 Catalyst", is located within tubular housing 30. For convenience, the housing is divided into first chamber 34, which contains pellets 36 of the catalyst, and second chamber 38, which contains pellets 40 of the catalyst. By providing two separate chambers within the decomposition chamber, the pellets 36 can be of finer grade, such as 20 to 30 mesh, as compared to the pellets 40 which can be of coarser 14 to 18 mesh size. Separator 42 is a flanged disc with perforations therethrough and having screen 44 on the front side thereof. This screen permits liquid hydrazine flow, as well as flow of gaseous decomposition products from first chamber 34 to second chamber 38. Separator 42 is retained in place by means of weld spots extending through tubular housing 30 to the separator flange.

The downstream end of chamber 38 carries screen support 46 therein. Screen 48 is carried on the screen support 46 to retain the pellets 40 within the second chamber 38, but to permit the gaseous decomposition products of hydrazine to pass therethrough. Convergent-divergent nozzle 50 is secured to the rear end of tubular housing 30, to receive the hot gases of decomposition. If desired, some of the pressurized hot gas can be led to another use, as by pipe 52, such as for the driving of a turbine and the like.

Liquid hydrazine is injected into the decomposition chamber 28. Liquid hydrazine is delivered from a control valve through hydrazine delivery tube 54. Tube 54 is connected to the front of injector housing 58, in a suitable collar, and delivers liquid hydrazine directly to orifice 60 integrally formed in injector housing 58. The exterior of injector housing 58 has an annular shoulder 62, see FIG. 3, which abuts against the back of baseplate 18, while the forward portion of the injector housing extends through an opening in the baseplate. The interior of injector housing 58 is cylindrical, as shown in FIG. 4.

Distributor 64 is a cup open to the rear thereof and of suitable external dimensions to fit closely within the cylindrical interior of injector housing 58. It is preferably a press fit therein. The exterior of distributor 64 carries slots 66 and 68 radially across the front thereof, which slots are positioned in alignment with orifice 60 to receive liquid hydrazine therefrom. Lengthwise along the outer surface, slots 70, 72, 74, and 76 are formed to intersect with the slots 66 and 68. Thus, the slots form distributing flow passages or channels for the liquid hydrazine, delivering the hydrazine toward the rear of the injector 56. While four distribution channels are illustrated, more or less can be provided, depending upon the flow requirement. For a small thruster, four is adequate. When a larger thrust is provided, 6, 8, or even more flow passages can be provided. When eight passages are used, the structure can be arranged so that four provide radial flow at the injector outlet and four provide longitudinal flow. The radial and longitudinal outlets are alternated around the periphery of the injector. Larger flow devices could embody additional flow passages for the purpose of maintaining uniform flow distribution. Of course, the combined structure shown can be used on all outlets. Both the amount of liquid hydrazine flow and the size of the decomposition chamber to which the liquid is distributed are related to the number of desired flow channels. The liquid hydrazine thus flows longitudinally of injector 56 toward the rear end thereof. As illustrated in FIG. 3, injector housing 58 is slotted at 78, in line with slot 70, so that there is an outwardly-directed slot opening at the rear end of the injector housing, as well as the longitudinally directed one. Each of the other longitudinal slots has a corresponding lateral end slot on the rear end of the injector housing.

Figure 2:
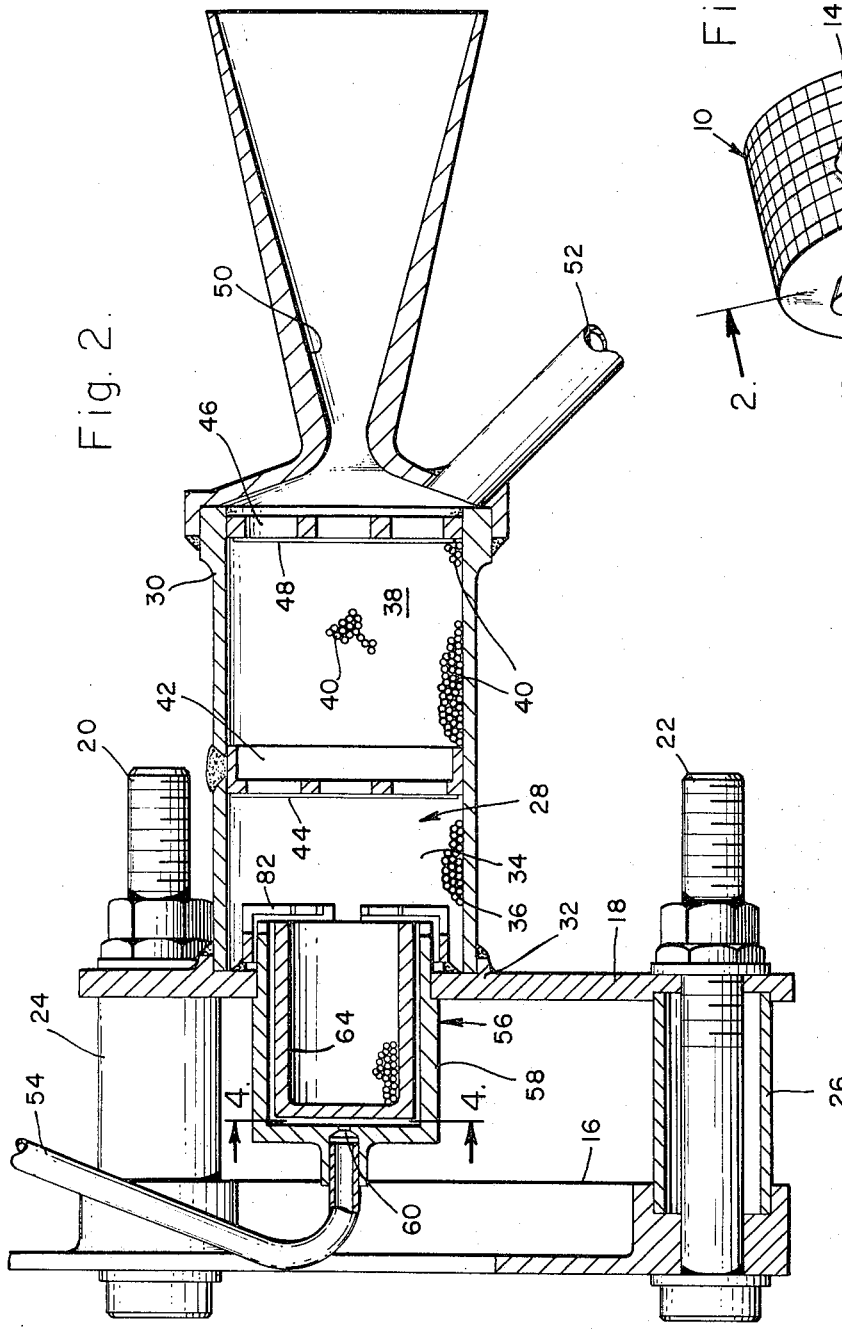
FIG. 2 is an enlarged section taken generally on line 2—2 of FIG. 1, showing the hydrazine gas generator as a thruster, generally in longitudinal section.

Two layers of fine mesh screen are formed into a cup-shaped screen structure 80 which is located over the rear end of the injector housing to cover the slots 70 through 78. Screen structure 80 acts to diffuse the liquid hydrazine as it flows from the injector slots into the decomposition chamber and prevents fines from the catalyst pellets from entering the injector slots when there is no flow. Cap 82 engages over the screen structure 80 and holds it in place. Cap 82 is an annular structure with a rear face having a central opening and a forwardly-extending annular flange which engages around the outside of injector housing 58, as shown in FIG. 2. Four slots, one of which is indicated at 84, which extend through the face and partway down the annular flange, align with the distributor slots to permit the outflow of the liquid hydrazine from the distributor slots through screen structure 80 and out of the cap slots. In this way, optimum distribution of the liquid is achieved.

Liquid flow is distributed into first chamber 34 where decomposition starts. It should also be noted that the distributor 64 is cup-shaped to provide a distributor chamber 86 which contains some of the catalyst pellets 36. A certain amount of the liquid enters the chamber 86 for the decomposition thereof. The heat thus generated by the decomposition, both in the distributor chamber 86 and in first chamber 34, heats the injector 56. This injector heating aids in efficiency of decomposition. The chambers are thus pressurized, and hot gases flow to the rear of thruster 12. The passage includes passage through chamber 38 and its catalyst 40 to finalize decomposition. Upon leaving the catalyst bed, the heat gases are accelerated through nozzle 50. From the comparatively low velocity in the decomposition chamber, the gases are accelerated to sonic velocity at the nozzle throat and are further accelerated in the diverging section of the nozzle. The high velocity gases are then expelled from the device producing a reactive force which is the useful thrust output of the device.

In addition to the production of thrust, pipe 52 leads pressurized gas away for other purposes. The gas generated can be used to perform many other functions, for example, measuring chamber pressure, pressurization of liquid storage vessels as an energy source for operating pistons, switches, levers or valves, or to turn a rotor. If no thrust is desired, the nozzle 50 can be closed and all of the product gas can be utilized out of pipe 52.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the appended claims.

What is claimed is:

1. A hydrazine gas generator comprising:
   a decomposition chamber for containing a decomposition catalyst;
   a liquid distributor for distributing liquid which is exothermically decomposable in the presence of the decomposition catalyst;
   an outlet from said decomposition chamber to permit the discharge of hot gaseous products of decomposition for utilization, said liquid distributor comprising:
   an orifice for controlling hydrazine liquid flow to said decomposition chamber;

an injector housing having an internal surface a distributor body having an external surface positioned within said injector housing, said surfaces being in contact with each other, a plurality of grooves formed in at least one of said surfaces to define a plurality of passages, said passages being connected to receive liquid passed through said orifice, said passages opening into said decomposition chamber so that liquid passing through said orifice is delivered into said decomposition chamber in a plurality of locations.

2. The gas generator of claim 1 wherein said external surface of said distributor body is an exterior cylindrical surface, and said passages are slots formed into the exterior cylindrical surface of said distributor body.

3. The gas generator of claim 2 wherein said orifice is positioned in said injector housing.

4. The gas generator of claim 3 wherein said one of said surface includes an end surface which has divergent passages formed therein.

5. The gas generator of claim 4 wherein said divergent passages intersect substantially on the axis of said cylindrical exterior surface of said distributor body, and said orifice is positioned substantially on said axis.

6. A hydrazine gas generator comprising:

a decomposition chamber for containing a decomposition catalyst, said decomposition chamber comprising a baseplate, walls secured to said base plate defining the side walls of said decomposition chamber, a perforated separator extending between said side walls to separate said decomposition chamber into a first chamber and a second chamber, said second decomposition chamber having an open end through which gas is discharged, a screen in said end to retain catalyst within said decomposition chamber;

utilization means attached to said walls across the open end of said decomposition chamber for receiving gas generated by decomposition in said decomposition chamber;

a liquid distributor for distributing liquid which is decomposable with the liberation of heat in the presence of the decomposition catalyst, said liquid distributor being secured to said base plate, said liquid distributor comprising:

an injector housing, an orifice in said injector housing for controlling liquid flow into said liquid distributor, a distributor body positioned within said injector housing, said distributor body having an exterior cylindrical surface, a plurality of slots formed on the exterior of said distributor body to form distributor passages for liquid flow, said passages opening into said decomposition chamber so that liquid passing through said passages is delivered into said decomposition chamber in a plurality of locations, said distributor body being formed with an interior opening which is separated from said distribution passages and which is in communication with said decomposition chamber and catalyst therein so that exothermic decomposition within said distributor body causes heating thereof, for preheating liquid in said distribution channels.

7. A hydrazine gas generator comprising:

a decomposition chamber for containing a decomposition catalyst;

a liquid distributor for distributing liquid which is exothermically decomposable in the presence of the decomposition catalyst;

an outlet from said decomposition chamber to permit the discharge of hot gaseous products of decomposition for utilization, said liquid distributor comprising:

an orifice, an injector housing, a distributor body having an exterior cylindrical surface positioned within said injector housing, a plurality of slots formed in the external cylindrical surface of said distributor body, said slots forming a plurality of passages, said passages being connected to receive liquid passing through said orifice, said passages opening into said decomposition chamber so that liquid passing through said orifice is delivered into said decomposition chamber in a plurality of locations and a screen positioned over the outlets of said distribution passages into said decomposition chamber.

8. The gas generator of claim 7 wherein a cap is positioned over the end of said injector housing, said cap engaging over said screen to hold said screen over the outlet ends of said distributor passages into said decomposition chamber.

9. The gas generator of claim 1 wherein a screen is positioned over the outlet of said distribution passages into said decomposition chamber.

10. The gas generator of claim 9 wherein a cap is positioned over the end of said injector housing, said cap engaging over said screen to hold said screen over the outlet ends of said distributor passages into said decomposition chamber.

* * * * *